(12) United States Patent
Duncan

(10) Patent No.: US 6,575,475 B1
(45) Date of Patent: Jun. 10, 2003

(54) TEAR-OUT RUBBER COUPLING

(75) Inventor: Scott Duncan, Santa Rosa, CA (US)

(73) Assignee: MCP Industries, Inc., Corona, CA (US)

( * ) Notice: Subject to any disclaimer, the term of this patent is extended or adjusted under 35 U.S.C. 154(b) by 161 days.

(21) Appl. No.: 09/765,758

(22) Filed: Jan. 19, 2001

(51) Int. Cl.$^7$ ................................................ F16L 17/06
(52) U.S. Cl. ........................ 277/607; 277/609; 277/917
(58) Field of Search ................................ 277/602, 607, 277/609, 917; 285/3, 4, 369; 138/90, 92, 94, 89; 73/46, 49.1, 49.5, 49.8

(56) References Cited

U.S. PATENT DOCUMENTS

| | | | |
|---|---|---|---|
| 1,933,117 A | * 10/1933 | Markle | 220/265 |
| 3,654,965 A | * 4/1972 | Gramain | 138/89 |
| 3,844,585 A | * 10/1974 | Sands et al. | 285/3 |
| 4,429,568 A | * 2/1984 | Sullivan | 138/90 |
| 4,602,504 A | 7/1986 | Barber | |
| 4,706,482 A | 11/1987 | Barber | |
| 4,848,155 A | 7/1989 | Huber | |
| 4,863,306 A | * 9/1989 | Muenzer | 403/299 |
| 4,902,043 A | * 2/1990 | Zillig et al. | 138/89 |
| 4,936,350 A | 6/1990 | Huber | |
| 5,033,510 A | 7/1991 | Huber | |
| 5,078,429 A | * 1/1992 | Braut et al. | 285/148.13 |
| 5,106,127 A | * 4/1992 | Briet | 285/110 |
| 5,163,480 A | 11/1992 | Huber | |
| 5,507,501 A | 4/1996 | Palmer | |
| 5,711,536 A | * 1/1998 | Meyers | 277/606 |
| 6,032,515 A | 3/2000 | Huber | |
| 6,082,183 A | 7/2000 | Huber | |
| 6,085,362 A | 7/2000 | Huber | |
| 6,085,363 A | 7/2000 | Huber | |
| 6,234,007 B1 | * 5/2001 | Pampinella | 138/89 |

* cited by examiner

Primary Examiner—Anthony Knight
Assistant Examiner—John L. Beres
(74) Attorney, Agent, or Firm—John J. Connors; Connors & Associates, Inc.

(57) ABSTRACT

A unitary removable barrier for installation in a cylindrical water line to selectively block the water line to passage of water therethrough. The unitary removable barrier is composed of a single piece rubber body having at least one cylindrical section sized to receive upstream and downstream pipes of the water line. A unitary rubber planar disc molded with the cylindrical section is of a circular circumference and which completely blocks the water line but which is selectively removable from the cylindrical section thus removing the barrier to the passage of the water through the line.

11 Claims, 3 Drawing Sheets

FIG. 1

TEAR-OUT RUBBER COUPLING

TECHNICAL FIELD OF INVENTION

The present invention deals with a unitary removable barrier for installation in a cylindrical water line for temporarily blocking the passage of water through the line. When plumbing a structure such as a house intended to carry water, the structure goes through several waste line tests to confirm the integrity of the various plumbing joints. This requires temporarily blocking the waste line so that the water lines within the structure can be filled and leaks detected. The present invention involves an improved means of temporarily blocking the water waste line in order to create a suitable water head to conduct such testing.

BACKGROUND OF THE INVENTION

When plumbing a structure such as a house, the structure is subjected to at least two different waste water tests. A first test is intended to determine the integrity of the water lines at ground or slab by filling the structure's waste lines with water to create a pressure head. A second test is conducted at "top-out" meaning that after the structure is vented and tubs, sinks and other fixtures are installed, the waste lines are again filled with water to create yet another pressure head. Under pressure, the various lines are inspected for leakage prior to the installation of sheetrock which would obviously mask the detection of any leakage.

As background, plumbers are required to "stub out" or create an external waste line outlet two or three feet from the perimeter of the structural foundation. The "stub out" line is typically capped off in order to run the above-described water tests. There are a variety of currently available caps designed to accomplish this task. For example, a plumber may employ a rubber cap with a stainless steel band. However, a rubber cap is prone to being blown off of the "stub out" if subjected to sufficient water head pressure. In order to prevent this from occurring, the plumber will oftentimes drive a wooden stake in front of the rubber cap. This entails a good deal of additional effort and is not particularly effective in preventing blow-off. As an alternative, a plumber may glue the plastic test cap to the "stub out" which can be knocked off after the test has been conducted. However, this requires applying and setting a suitable adhesive which obviously must later be removed once the test has been completed. At removal, the plumber is likely to get quite wet as the water head pressure is released. There are additional problems associated with caps employed at "stub out." For example, when a sewer line to the street or septic is about to be connected, the plumber is oftentimes not the party responsible for making the connection. If someone else makes the connection who is unfamiliar with this process, the cap will be cut off or otherwise removed releasing the water head within the structure perhaps prematurely before the plumber has had an opportunity to check the structure for leaks. Even if the plumber is the party responsible for connecting the sewer line to the "stub out," he may still be forced to release his test and then recap the line after the connection has been made thus requiring that the water head be reestablished. This is time-consuming and also is a waste of water. Ideally, the plumber would like to maintain a water head throughout the sheetrock process so that any accidental nailing into the waste line would be visible by observing water leakage.

In addition to the above, once the sewer has been connected, it is traditional for the plumber to return to the project to reset his waste lines at which point a plumber employs a wye, a one-eighth bend and a clean-out plug at the point where the sewer has been connected. A plumber typically employs a long test ball which is inserted into the one-eighth band and wye and is inflated at the appropriate position. The test ball is intended to temporarily block the waste line to again create a suitable pressure head within the structure. However, these test balls are extremely expensive and by reducing pressure within the test ball, they can be removed and oftentimes stolen from the job site. Further, they can inadvertently lose air, slip down the line and cause a major stoppage which must be dealt with by excavating and exposing the sewer line. The air balls, which exhibit external ribs, crack after repeated usage and tend to leak under tests. Leakage from the side wall of the test ball as well as from its air stem obviously results in water leakage to the sewer and reduction of water head thus reducing the effectiveness of the test.

One way of dealing with this issue has been disclosed in U.S. Pat. No. 5,507,501. The invention disclosed in the '501 patent is to a disk-shaped sealing device which is molded as an integral, unitary piece. The sealing device comprises a circular disc and an angled flange extending outwardly and upwardly from the perimeter of the circular disc. The disc-shaped device fits snugly within a barrel of a plastic fitting such that the circular disc is coaxially received in the barrel of the plastic fitting and the angled flange mates with and lies against a bevel in the barrel of the plastic fitting. A lug extends downwardly from the circular disc whereby first and second elongate grooves are formed in one of the surfaces of the disc. It is taught that the disc-shaped device can be ripped out of the barrel of the fitting so as to remove the device in its entirety from the fitting by pulling on the lug and ripping the circular disc along the first and second grooves in a spiral ripping motion that ultimately pulls the circular disc and the angled flange from the fitting.

Although the invention disclosed in the '501 patent constitutes a dramatic improvement over devices of the prior art described above, it, itself, is not without its limitations. Specifically, the disc-shaped sealing device must be employed only in a waste line which will accept an angled flange. As such, the device cannot be used when a water line is provided with a consistent and uniform interior diameter throughout its length. In addition, the disc-shaped sealing device must, itself, be sealed to the receiving ledge or flange of a waste line to ensure that the disc remains in sealing engagement with the water line during tests. This requires either the use of a glue or wax to ensure that the disc-shaped sealing device remains in place. It is hypothesized that these limitations have prevented the device described in the '501 patent from being universally accepted in the plumbing trade.

It is thus an object of the present invention to provide a means of temporarily blocking a "stub out" or water line which can effectively and temporarily prevent passage of water through the waste line thus creating a suitable pressure head within the structure while being easily removable from the waste line and while addressing all of the drawbacks recited above.

These objects will be more readily apparent when considering the following disclosure and appended drawings.

SUMMARY OF THE INVENTION

The present invention is directed toward a unitary removable barrier for installation in a cylindrical water line to selectively block the water line to the passage of water therethrough. The unitary removable barrier is composed of a one-piece rubber body having at least one cylindrical section having at least one cross-sectional area, longitudinal axis and sized to receive an upstream pipe and downstream pipe of the water line. The upstream pipe and downstream pipe are captured by said at least one cylindrical section either frictionally or by use of stainless steel bands. The unitary removable barrier includes a rubber disc molded as a unitary structure with said at least one cylindrical section which is characterized as being of circular circumference and which completely blocks the water line when in place. The disc is provided with a diameter which is substantially perpendicular to the longitudinal axis and which is selectively removable from the cylindrical section thus removing the barrier to the water line.

DETAILED DESCRIPTION OF THE INVENTION

Figure 2:
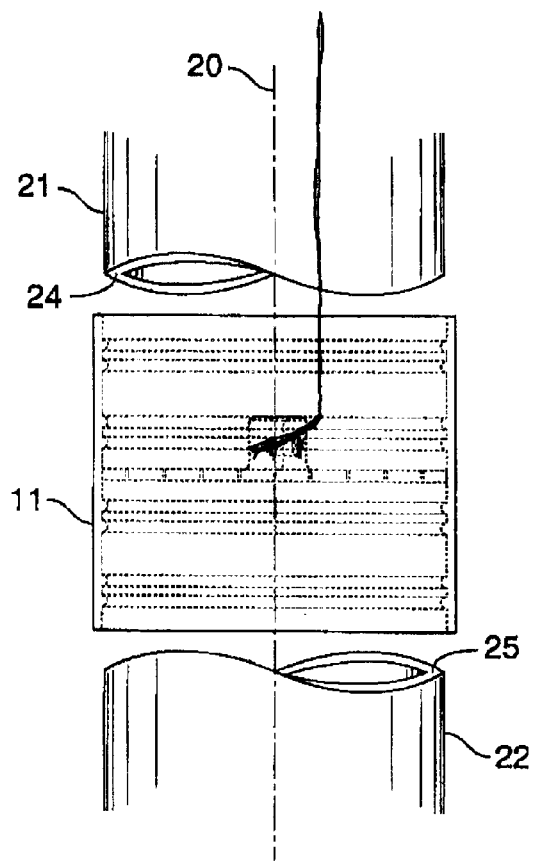
FIG. 2 is a side plan view of the unitary removable barrier FIG. 1.

In referring to FIG. 2, pipes 21 and 22 comprise "stub out" or "clean-out line" which, as noted, extends from a house or other structure for connection to a sewer or septic line. In a first embodiment, the present invention is in the form of a coupling 10 for placement between and to capture pipes 21 and 22 by frictionally receiving them within cylindrical section 11. In other words, the outer diameter of pipes 21 and 22 approximate inner diameter 26 although the present invention contemplates the use of any well-known clamping means such as stainless steel bands to ensure a watertight snug fit between cylindrical section 11 and pipes 21 and 22 along longitudinal axis 20.

Unitary removable barrier 20 is composed of rubber. It is molded as a unitary article whereby cylindrical section 1 1 and planar disc section 12 are of a single piece. In this regard, diameter 26 extending from the geometric center of disc 12 and extending to the inside diameter of cylindrical section 11 is substantially perpendicular to longitudinal axis 20 passing through upstream and downstream cylindrical water line 21 and 22. Again, as previously noted, as one embodiment, unitary removable barrier 10 is sized such that the inside diameter of cylindrical section 11 as defined by the extremity of diameter 26 is to frictionally receive water lines 21 and 22 along longitudinal axis 20.

When it is no longer desired to block the passage of water through the water waste line as defined by pipes 21 and 22, circular disc 12 is removed. This is ideally done by attaching a pull cord (30) to lug 13 and withdrawing the cord from the water line through a wye or tee traditionally fabricated within such a line. Groove 14 is fabricated within disc 12 helically extending from lug 13 and extending outwardly toward the side wall of cylindrical section 11. Removal of disc 12 is carried out when hydraulic testing of the plumbing system of structure is no longer required. As such, when disc 12 is removed, the waste water line as established by pipes 21 and 22 is opened providing a free water path for the structure.

In a preferred embodiment of the present invention, it is noted that upon the removal of planar disc 12, a portion of the disc remains as defined by a ledge 15 of planar disc material. Ledge 15 is sized such that inner diameters 24 and 25 of cylindrical lines 21 and 22, respectively, coincide with the inner circumference of ledge 15 so that an uninterrupted substantially uniform inner pipe diameter is created thus minimizing any adverse effect that the present invention would otherwise have on the free flow of water through the subject waste line. Stated differently, when planar disc 12 is removed from cylindrical section 11, ledge 15 of the planar disc remains providing a circular opening within cylindrical section 11 substantially equal to inside diameters 24 and 25 of upstream and downstream pipes 21 and 22.

Figure 1:
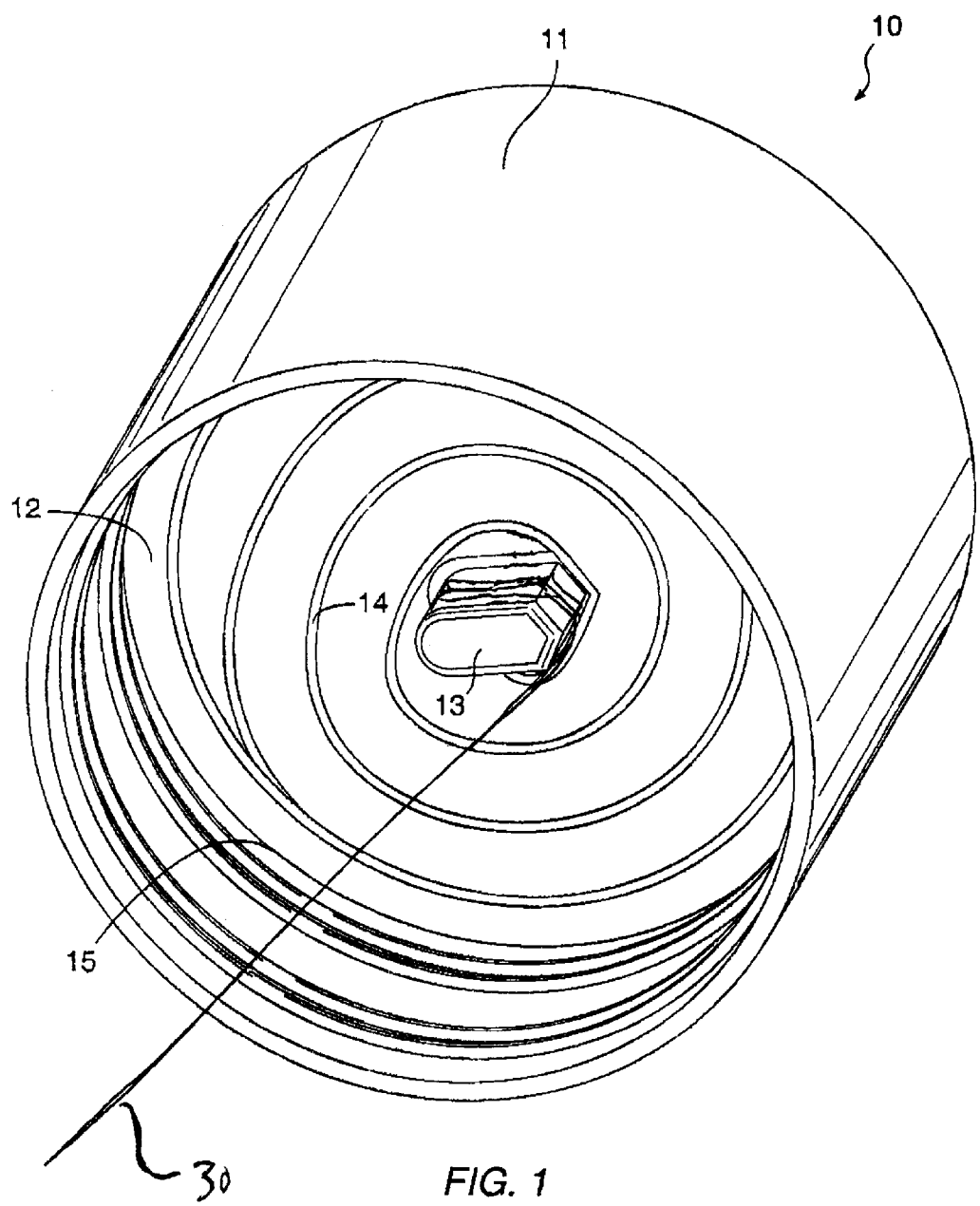
FIG. 1 is a perspective view of one embodiment of a unitary removable barrier of the present invention.
Figure 3:
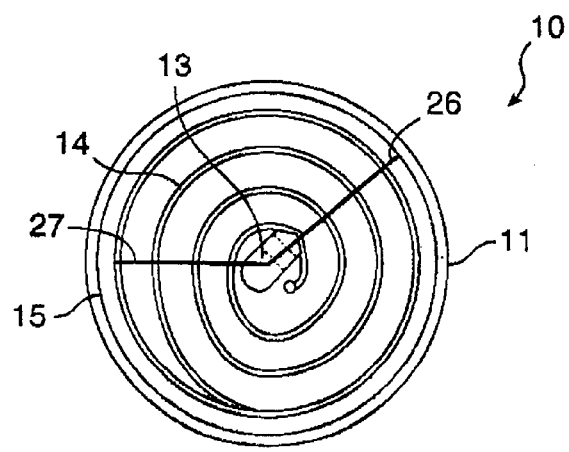
FIG. 3 is a top plan view of the unitary removable barrier of FIG. 1.

To summarize, although others have taught the use of removable blocking means to selectively prevent water from passing through a waste line in order to hydraulically test the plumbing of a structure, there have been no prior attempts to construct such an element which works as conveniently and which provides less obstruction as the invention disclosed herein. The present invention requires no gluing, waxing or other sealing means to attach the removable blocking disc to the waste water line. Further, in the embodiment show in FIGS. 1 through 3, upon its removal, the disc provides the line with an opening substantially equal to the inside diameter of the line itself. As such, there represents little or no obstruction to the line upon removal of the disc.

Figure 4:
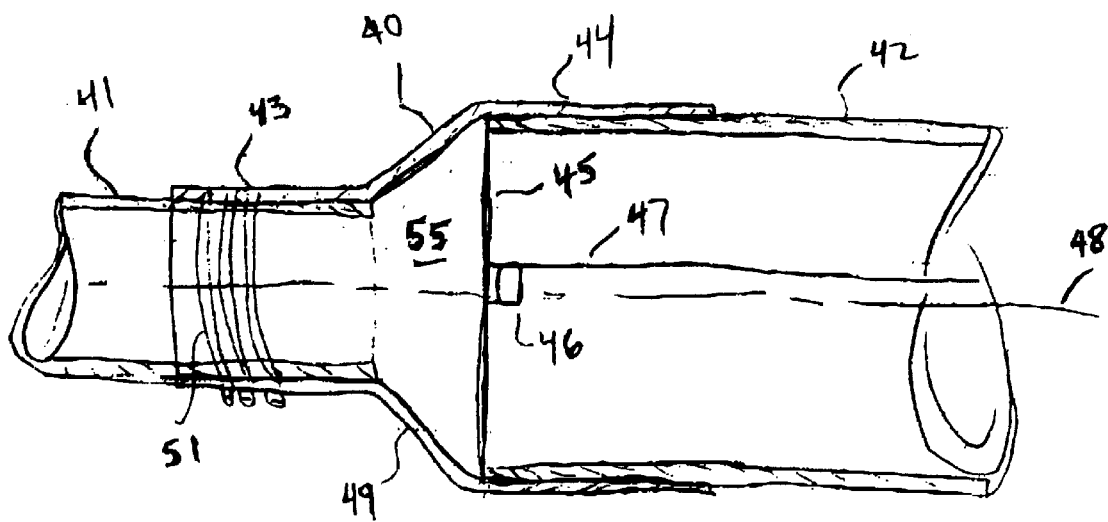
FIG. 4 is a side cross sectional view of a second embodiment of the present invention.

In a second embodiment, reference is made to FIG. 4. In this instance, it is commonplace, for example, to provide PVC pipe 41, eminating from a structure, to act as a wasteline for connection to PVC pipe 42 of a different, in this instance, larger diameter. In such an installation, coupling 40, again composed of a unitary molded article is provided with upstream cylingical section 43 of a first (smaller) diameter and a downstream cylindrical section 44 of a second (larger) diameter. Cylindrical sections 43 and 44 are connected by diagonally extending side wall 49 as shown.

As in the previous embodiment, cylindrical sections 43 and 44 of unitary article 40 can be sized to frictionally capture pipes 41 and 42, respectively thus obviating the need for any further coupling means. However, any suitable capturing device can further be employed such as stainless steel bands 51 to ensure a water tight and secure fitting.

Again, as in the previous embodiment, unitary removable rubber barrier 45 molded as a unitary article to cylindrical sections 43 and 44 and transitional section 49 remains in place during test but is selective removable after a suitable water pressure test has been conducted. In doing so, pull cord 47, appended to lug 46 is drawn through a wye or tee (not shown) traditionally found within the typical water waste line. The same groove such as groove 14 shown in FIG. 1 can be fabricated within disk 45 helically extending from lug 46 and extending outwardly toward the side wall defined by cylindrical section 44.

As noted in the embodiment shown in FIG. 4, PVC pipes 41 and 42 do not abut one another although, ideally, pipe 42 is caused to abut removable disc 45. As such, the unitary removable barrier 40 as depicted in FIG. 4 acts to retain pipes 41 and 42 in a pre-determined orientation whereby void space 55 remains between the end of each pipe length.

I claim:

1. A unitary removable barrier for installation in a cylindrical water line to selectively block the water line to passage of water therethrough, said unitary removable barrier being composed of a single piece rubber body having a cylindrical section having a cross-sectional area, longitudinal axis and sized to frictionally receive an upstream pipe and downstream pipe of said water line, each of said pipes having substantially equal inside diameters, said upstream pipe and said downstream pipe substantially abutting one another at a rubber planar disc molded with said cylindrical section which is characterized as being of circular circumference which completely blocks said cross-sectional area, having a diameter which is substantially perpendicular to said longitudinal axis and which is selectively removable from said cylindrical section thus removing said barrier to said water line.

2. The unitary removable barrier of claim 1 wherein when said planar disc is removed from said cylindrical section, a ledge of said planar disc remains providing a circular opening within said cylindrical section substantially equal to the inside diameters of said upstream and downstream pipes.

3. The unitary removable barrier of claim 1 wherein said planar disc is provided with at least one score line to facilitate its removal from said cylindrical section.

4. The unitary removable barrier of claim 3 wherein said at least one score line comprises a helical score line from a centerpoint on said planar disc to the circumference of said planar disc.

5. The unitary removable barrier of claim 3 wherein a pull line is appended to said planar disc which extends outside of said cylindrical water line such that by pulling on said pull line, said planar disc ruptures along said score line whereupon said planar disc is removable from said water line.

6. The unitary removable barrier of claim 5 wherein said pull line is appended to a lug located at the geometric center of said planar disc.

7. The unitary removable barrier of claim 1 wherein said at least one cylindrical section is designed to frictionally receive said upstream pipe and downstream pipe of said water line.

8. The uniting removable barrier of claim 1 wherein said upstream pipe and said downstream pipe substantially abut one another at said unitary removable barrier.

9. A unitary removable barrier for installation in a cylindrical water line to selectively block the water line to passage of water therethrough, said unitary barrier being composed of a single piece rubber body having a first cylindrical section of first diameter and a second cylindrical section of second diameter and a longitudinal axis passing through both first and second cylindrical sections, said first cylindrical section sized to receive an upstream pipe and said second cylindrical section sized to receive a downstream pipe of said water line and, when said upstream pipe and said downstream pipe are received, respectively, by said first and second cylindrical sections, a rubber disc molded as a unitary piece with said first and second cylindrical sections is positioned between said upstream pipe and downstream pipe to completely block said water line to the passage of water between said upstream pipe and downstream pipe, said rubber disc being completely removable from said water line.

10. The unitary removable barrier of claim 9 wherein said rubber disc is characterized as having a diameter substantially equal to the diameter of said downstream pipe.

11. The unitary removable barrier of claim 9 wherein said rubber disc is provided with at least one score line to facilitate its removal from said water line.

* * * * *

UNITED STATES PATENT AND TRADEMARK OFFICE
CERTIFICATE OF CORRECTION

PATENT NO. : 6,575,475 B1
DATED : June 10, 2003
INVENTOR(S) : Scott Duncan

It is certified that error appears in the above-identified patent and that said Letters Patent is hereby corrected as shown below:

Column 6,
Line 5, the word "uniting" should be -- unitary --

Signed and Sealed this

Fifth Day of April, 2005

JON W. DUDAS
*Director of the United States Patent and Trademark Office*